United States Patent
Santan et al.

(10) Patent No.: US 10,402,223 B1
(45) Date of Patent: Sep. 3, 2019

(54) SCHEDULING HARDWARE RESOURCES FOR OFFLOADING FUNCTIONS IN A HETEROGENEOUS COMPUTING SYSTEM

(71) Applicant: Xilinx, Inc., San Jose, CA (US)

(72) Inventors: Sonal Santan, San Jose, CA (US); Soren T. Soe, San Jose, CA (US)

(73) Assignee: XILINX, INC., San Jose, CA (US)

( * ) Notice: Subject to any disclaimer, the term of this patent is extended or adjusted under 35 U.S.C. 154(b) by 143 days.

(21) Appl. No.: 15/498,226

(22) Filed: Apr. 26, 2017

(51) Int. Cl.
*G06F 9/48* (2006.01)
*G06F 13/22* (2006.01)
*G06F 13/28* (2006.01)
*G06F 13/16* (2006.01)

(52) U.S. Cl.
CPC ........ *G06F 9/4881* (2013.01); *G06F 13/1642* (2013.01); *G06F 13/22* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 8,195,883 B2 * | 6/2012 | Jain | ..................... | G06F 12/0813 710/100 |
| 8,510,496 B1 * | 8/2013 | Totolos, Jr. | ........... | G06F 3/0613 711/147 |
| 9,047,178 B2 * | 6/2015 | Talagala | ............... | G06F 12/0246 |
| 9,880,750 B1 * | 1/2018 | Ravindran | ............ | G06F 3/0613 |
| 2005/0086660 A1 * | 4/2005 | Accapadi | ............... | G06F 9/4881 718/107 |
| 2005/0166206 A1 * | 7/2005 | Parson | .................... | G06F 9/526 718/104 |
| 2013/0111077 A1 * | 5/2013 | Gowravaram | .......... | G06F 13/28 710/22 |
| 2017/0103039 A1 * | 4/2017 | Shamis | ............. | G06F 15/17331 |
| 2017/0227603 A1 * | 8/2017 | Hamid | ............... | G01R 31/3177 |

* cited by examiner

*Primary Examiner* — Michael Sun
(74) *Attorney, Agent, or Firm* — Kevin T. Cuenot

(57) ABSTRACT

A heterogeneous computing system can include a host memory and a host processor. The host memory is configured to maintain a write task queue and a read task queue. The host processor is coupled to the host memory and a processing device. The host processor is adapted to store write tasks in the write task queue. The write tasks cause transfer of input data to the processing device. The processing device is adapted to perform offloaded functions. The host processor is adapted to store read tasks in the read task queue. The read tasks cause transfer of results from the offloaded functions from the processing device. The host processor is further adapted to maintain a number of direct memory access (DMA) worker threads corresponding to concurrent data transfer capability of the processing device. Each DMA worker thread is preconfigured to execute tasks from the write task queue or the read task queue.

20 Claims, 3 Drawing Sheets

SCHEDULING HARDWARE RESOURCES FOR OFFLOADING FUNCTIONS IN A HETEROGENEOUS COMPUTING SYSTEM

TECHNICAL FIELD

This disclosure relates to heterogeneous computing systems and, more particularly, to scheduling hardware resources for offloading functions to processing devices within a heterogeneous computing system.

BACKGROUND

A heterogeneous computing system (HCS) refers to a type of data processing system that includes a host processor and one or more other different processing devices. The host processor, or "host," is typically implemented as a central processing unit (CPU). The host is coupled to the other processing devices through interface circuitry such as a bus. The other processing devices are architecturally different from the host. Still, the processing devices are capable of performing functions offloaded from the host and making results available to the host.

Within some HCSs, the processing devices are adapted to execute program code. Such processing devices typically utilize an instruction set architecture that differs from the host. Examples of these processing devices include, but are not limited to, graphics processing unit(s) (GPUs), digital signal processor(s) (DSPs), and so forth. In some HCSs, the processing devices that perform functions offloaded by the host include processing devices adapted to hardware accelerate the functions. These processing devices include circuitry that implements the offloaded program code (functions). The circuitry is functionally equivalent to an executable version of the offloaded program code. Examples of processing devices capable of hardware acceleration include programmable integrated circuits (ICs) such as field programmable gate arrays (FPGAs), partially programmable ICs, application specific ICs (ASICs), and so forth. Appreciably, an HCS may include a combination of processing devices where one or more are adapted to execute program code and one or more others are adapted to hardware accelerate program code.

The host is charged with offloading tasks to the processing devices and retrieving results from the processing devices. Thus, the ability of the host to efficiently move the necessary data to and from the processing devices can significantly affect the overall efficiency and performance of the HCS.

SUMMARY

One or more embodiments are directed to systems. In one aspect, a system is implemented as a heterogeneous computing system (HCS). The system can include a host memory and a host processor. The host memory is configured to maintain a write task queue and a read task queue. The host processor is coupled to the host memory and a processing device. The host processor is adapted to add write tasks to the write task queue. The write tasks cause transfer of input data to the processing device. The processing device is adapted to perform functions offloaded from the host processor. The host processor is adapted to add read tasks to the read task queue. The read tasks cause transfer of results from the functions from the processing device. The host processor is further adapted to maintain a number of direct memory access (DMA) worker threads corresponding to concurrent data transfer capability of the processing device. Each DMA worker thread is preconfigured to execute tasks from the write task queue or the read task queue.

One or more embodiments are directed to methods of scheduling hardware resources within an HCS. In one aspect, the method can include adding, using a processor, write tasks to a write task queue, wherein the write tasks cause transfer of input data to a processing device adapted to perform functions offloaded from the processor. The method can include adding, using the processor, read tasks to a read task queue, wherein the read tasks cause transfer of results of the functions from the processing device. The method can include executing, using the processor, a number of write DMA worker threads corresponding to concurrent write capability of the processing device, wherein the write DMA worker threads are configured to process the write tasks from the write task queue. The method can include executing, using the processor, a number of read DMA worker threads corresponding to concurrent read capability of the processing device, wherein the read DMA worker threads are configured to process read tasks from the read task queue.

One or more embodiments are directed to computer program products for scheduling hardware resources within an HCS. In one aspect, a computer program product includes a computer readable storage medium having program code stored thereon. The program code is executable by a processor to perform operations including adding, using the processor, write tasks to a write task queue, wherein the write tasks cause transfer of input data to a processing device adapted to perform functions offloaded from the processor. The operations can include adding, using the processor, read tasks to a read task queue, wherein the read tasks cause transfer of results of the functions from the processing device. The operations can include executing, using the processor, a number of write DMA worker threads corresponding to concurrent write capability of the processing device, wherein the write DMA worker threads are configured to process the write tasks from the write task queue. The operations further can include executing, using the processor, a number of read DMA worker threads corresponding to concurrent read capability of the processing device, wherein the read DMA worker threads are configured to process read tasks from the read task queue.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
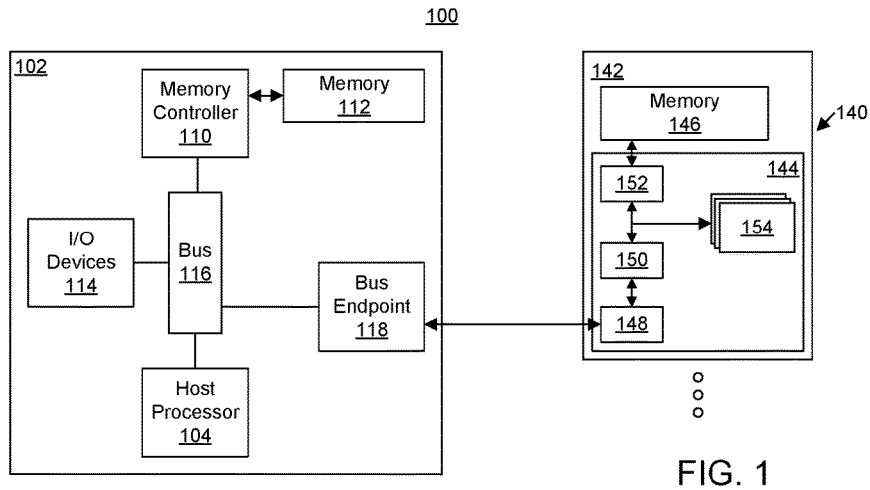
FIG. 1 illustrates an example heterogeneous computing system (HCS).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to heterogeneous computing systems and, more particularly, to scheduling hardware resources for offloading functions. A host processor (host) of a heterogeneous computing system (HCS) is adapted to execute an application. In executing the application, the host is capable of offloading one or more functions of the application to the various processing devices included within the HCS. An "offloaded function" refers to a function to be performed by a processing device as directed and/or assigned by a host or host system. The program code executed by the host that effectuates the offloading of the functions to processing devices is referred to as the "runtime." In general, the runtime provides the functions and/or drivers necessary to communicate with the processing devices. The runtime, for example, is capable of translating user commands formatted for a particular application programming interface (API) into hardware specific commands for a particular processing device. Typically, the application executed by the host is compiled to include or reference the runtime, e.g., as a library.

In accordance with the inventive arrangements described herein, a runtime is provided that may be executed by a host of an HCS. The runtime allows the host to efficiently schedule hardware resources to support offloading of functions to the processing devices included therein. The host, for example, is able to schedule operation of data transfer resources of the processing devices themselves for faster and more efficient operation. A runtime, as described herein, is capable of scheduling hardware resources of an HCS such as direct memory access (DMA) engines, compute units, allocation of memory buffers for use by processing devices (e.g., hardware accelerators), etc.

In another aspect, the runtime is capable of tracking task dependencies. The runtime is capable of automatically scheduling tasks based upon these dependencies. Further, the runtime is capable of determining the data transfer capabilities of the HCS. Based upon the determined data transfer capabilities, the runtime is capable of adapting to the capabilities and scheduling the hardware resources for concurrent and efficient operation. As such, the runtime increases operational efficiency and overall throughput of the HCS.

In addition, the runtime is capable of supporting any of a variety of different frameworks or APIs for heterogeneous computing systems. For example, the inventive arrangements may be used to schedule hardware resources within an HCS that utilizes OpenCL, OpenMP, CUDA, and so forth.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example HCS 100. HCS 100 includes a host system 102. Host system 102 includes a host processor (host) 104 coupled to a memory 112 through a bus 116 and a memory controller 110. By way of example, bus 116 may be implemented using any of a variety of different bus architectures such as Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, PCI Express (PCIe) bus, etc.

Host system 102 stores computer readable instructions (also referred to as "program code") within memory 112. Memory 112 is an example of a computer readable storage medium. Host 104 executes the program code accessed from memory 112 via bus 116 and memory controller 110. Host system 102 also stores data and/or configuration bitstreams within memory 112 for purposes of offloading functions to processing devices. For example, host 104 may obtain a configuration bitstream from memory 112 and provide the configuration bitstream to a programmable IC type of processing device (e.g., 144) to implement compute units therein.

Memory 112 includes one or more physical memory devices. For example, memory 112 may include a local memory and/or one or more bulk storage devices. Local memory refers to random access memory (RAM) or other non-persistent memory device(s) generally used during actual execution of the program code. Examples of bulk storage devices include, but are not limited to, a hard disk drive (HDD), solid state drive (SSD), or other persistent data storage device. Host system 102 may also include one or more cache memories (not shown) that provide temporary storage of at least some program code in order to reduce the number of times program code must be retrieved from the bulk storage device during execution.

Any data items used, generated, and/or operated upon by HCS 100 are functional data structures that impart functionality when employed as part of HCS 100. A "data structure" refers to a physical implementation of a data model's organization of data (and functions) within a physical memory. As such, a data structure is formed of specific electrical or magnetic structural elements in a memory. A data structure imposes physical organization on the data and/or functions stored in the memory as used by a processor.

Bus 116 may be coupled to one or more input/output (I/O) devices 114. Examples of I/O devices 114 include, but are not limited to, a keyboard, a display device, a pointing device, and/or one or more network adapters. A network adapter is a communication circuit configured to establish wired and/or wireless communication links with other devices. The communication links may be established over a network or as peer-to-peer communication links. Accordingly, a network adapter enables host system 102 to become coupled to other systems, computer systems, remote printers, and/or remote storage devices. Example network adapter(s) may include, but are not limited to, modems, cable modems, Ethernet cards, bus adapters, connectors, and so forth. Host system 102 may include one or more additional I/O device(s) beyond the examples provided. The I/O devices described herein may be coupled to host system 102 either directly or through intervening I/O controllers.

Host system 102 further includes a bus endpoint 118 that is coupled to bus 116. In one aspect, bus endpoint 118 is a PCIe endpoint. Host system 102 couples to an accelerator 140 through a communication channel using bus endpoint 118. In one aspect, accelerator 140 is a hardware accelerator. The communication channel may be a PCIe channel. Accelerator 140 may be implemented to include a circuit board (board) 142. In an example, board 142 has a form factor of a card having an edge connector that may be included within a PCIe slot of host system 102.

In the example of FIG. 1, the processing device is programmable IC 144. Programmable IC 144 is coupled to board 142. In an embodiment, programmable IC 144 is a field programmable gate array (FPGA). In one or more embodiments, programmable IC 144 includes a processor. The processor may be hardwired, e.g., hardened, circuitry, or formed using programmable circuitry. Programmable IC 144 may be any of a variety of ICs that include some programmable circuitry.

Board 142 further includes memory 146. Memory 146 may be implemented as local memory such as RAM. Memory 146 is another example of a computer readable storage medium. Programmable IC 144 is capable of implementing interface circuitry to effectuate reads and writes by host system 102 to and from memory 146. In one example, the interface circuitry includes a bus endpoint 148 that is capable of communicating with bus endpoint 118 of host system 102. Bus endpoint 148, for example, may be a PCIe endpoint. Bus endpoint 148 is capable of receiving transactions via the communication channel from host system 102 and placing transactions on the communication channel to host system 102.

Programmable IC 144 further includes a DMA controller 150 coupled to bus endpoint 148. DMA controller 150, for example, may be a PCIe DMA controller. DMA controller 150 further may be coupled to a memory controller 152. In one or more embodiments, DMA controller 150 is coupled to memory controller 152 via one or more interconnect circuit blocks (not shown).

In one aspect, DMA controller 150 may implement two or more DMA engines. Each of the DMA engines is capable of performing full duplex data transfers. For example, each DMA engine is capable of writing data from host system 102 to memory 146 and reading data from memory 146 to provide to host system 102 concurrently. Thus, in an example where DMA controller 150 implements two DMA engines, HCS 100 is capable of performing two concurrent reads and performing two concurrent writes from host system 102 to/from accelerator 140. More particularly, the concurrent reads and/or writes may be performed between memory 112 and memory 146. The two reads may be performed concurrently with the two writes.

A device such as programmable IC 144 performs offloaded functions from host system 102 using one or more compute unit circuits 154 implemented therein. In an embodiment, a compute unit circuit is associated with exactly one kernel instance on one processing device. A processing device, however, may have multiple kernel instances. The kernel instances may perform the same operation or different operations.

Compute unit circuits 154 may be coupled to interconnect circuit blocks (not shown) that also couple DMA controller 150 with memory controller 152. As such, compute unit circuits 154 are capable of communicating with host system 102. Compute unit circuits 154 are capable of performing functions offloaded by host 104. HCS 100 may include further boards with other processing devices, whether such processing devices are other programmable ICs, graphics processing units, digital signal processors, etc.

As generally discussed, host 104 is capable of retrieving a configuration bitstream, or a partial configuration bitstream (hereafter both referred to as a "configuration bitstream"), from memory 112. Host 104 is capable of providing the configuration bitstream to programmable IC 144 for loading therein via bus endpoints 118 and 148. Loading a configuration bitstream implements compute unit circuits 154 within programmable circuitry of programmable IC 144. In an aspect, particular blocks of the interface circuitry such as bus endpoint 148, DMA controller 150, the interconnect circuit blocks, and/or memory controller 152 may remain operational while loading new and/or different configuration bitstreams so that host system 102 remains in communication with programmable IC 144 while different kernels (and/or compute unit circuits) are implemented therein.

With compute unit circuits 154 implemented, host 104 is capable of providing, e.g., offloading, functions to programmable IC 144 for implementation by compute unit circuits 154. As discussed, the runtime executed by host 104 handles the operations necessary to offload the functions to programmable IC 144. Host 104, in executing the runtime, is capable of scheduling operations to be performed by the DMA engines of accelerator 140, compute unit circuits 154, etc. to facilitate the exchange of data between accelerator 140 and host system 102.

HCS 100 is provided as an example system capable of executing a runtime in accordance with the embodiments disclosed herein. The example of FIG. 1 is not intended to be limiting of the inventive arrangements described herein. For example, in one or more other embodiments, elements of the interface circuitry may be implemented on board 142, but may not be included within programmable IC 144. For example, bus endpoint 148, DMA controller 150, and/or memory controller 152 may be implemented as separate ICs coupled to board 142 and communicatively linked to host system 102, memory 146, and/or programmable IC 144.

Figure 2:
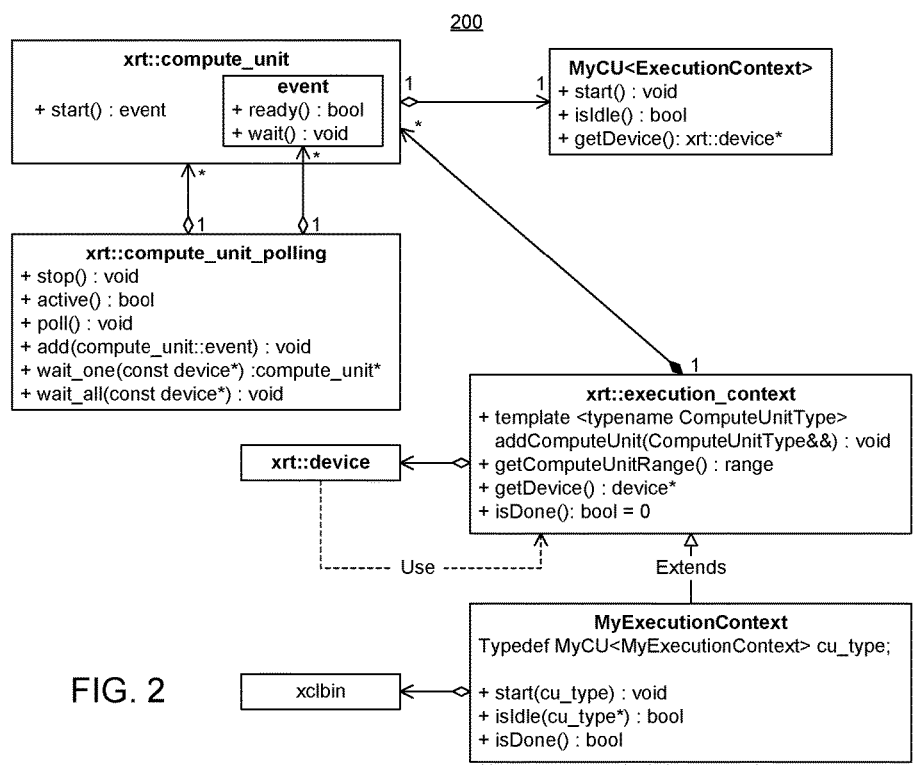
FIG. 2 illustrates an example class diagram for a runtime that is executable by a host processor.

FIG. 2 illustrates an example class diagram 200 for a runtime that is executable by host 104 of FIG. 1. Class diagram 200 illustrates various classes and the hierarchy of the software architecture for the runtime.

As pictured, class diagram 200 defines an execution context. The execution context is a class hierarchy having a base class "xrt::execution_context" with a user defined and derived class "MyExecutionContext". The user defined and derived class contains the details of how work is executed. For example, "MyExecutionContext" specifies the particular compute unit objects that are to perform the work. Compute unit objects correspond to compute unit circuits within programmable IC 144. In the case of OpenCL, for example, an execution context class defines work groups and schedules the work groups to run on compute unit circuits in an idle operating state. In one or more embodiments, a compute unit circuit may be shared, or correspond to, multiple compute unit objects in different execution contexts. The situation where a compute unit circuit is shared by multiple compute unit objects in different contexts may occur in the case of multiple simultaneous calls to the same offloaded function. Each function has an execution context.

As pictured, the base class is associated with a particular device represented as "xrt::device" representing programmable IC 144. The user defined and derived class "MyExecutionContext" is associated with a particular xclbin file. The xclbin file is a binary file or container that may include one or more different files. An xclbin file, for example, may include a configuration bitstream that may be loaded into a programmable IC in order to implement one or more compute unit circuits therein.

In one aspect, the host passes an object of "xrt::execution_context" to the "execute" method of the processing device (e.g., programmable IC 144). The execute method monitors running compute unit circuits using a polling infrastructure described in greater detail below. The execute method further is capable of starting compute unit circuits in an idle state if more work is to be performed based upon the execution context.

In another aspect, the execution context is a configurable class with a small API. The API is implemented by a concrete execution context. The compute unit circuits, which are encapsulated in a given execution context as compute unit objects, are also configurable with an API. The API provided by the compute unit objects provides functions to start the compute unit circuits represented by the respective compute unit objects and also to check for completion of the compute unit circuits. The configurability allows the runtime to utilize execution contexts and compute unit objects to fit any of a variety of different HCS architectures whether such architectures utilize PCIe bus or another bus type to communicate with processing devices. Further, the runtime is capable of operating with frameworks other than OpenCL and for various types of accelerators.

Once a compute unit circuit is operational within programmable IC 144 and performing work, the execution context associated with the compute unit circuit is capable of waiting for the compute unit circuit to finish the work before scheduling more work for the compute unit circuit to perform. A given work function is executed on one device only. Work groups do not span multiple processing devices. A processing device, however, may have multiple compute unit circuits therein. The multiple compute unit circuits in a single processing device such as programmable IC 144 are capable of all executing part of a same work function or executing multiple different work functions.

Class diagram 200 further defines a polling infrastructure that is configured to determine when compute unit circuits within a processing device such as programmable IC 144 are finished performing work. Class diagram 200 defines "xrt::compute_unit_polling" as a single thread to perform polling. In one aspect, the polling infrastructure is implemented as a single thread (e.g., "xrt::compute_unit_polling") also referred to herein as the "polling thread." The polling thread is independent of other threads.

The polling thread is capable of polling all compute unit circuits across one or more processing devices. For example, host system 102 may be coupled to more than one accelerator. In that case, the polling thread is configured to poll all of the compute units implemented in the plurality of accelerators (e.g., within two or more different programmable ICs). In one aspect, the polling infrastructure is capable of waiting for an arbitrary, single (e.g., a selected) compute unit circuit on a specific processing device to become idle. In another aspect, the polling infrastructure is capable of waiting for all compute unit circuits on a specific processing device to become idle.

A compute unit object is defined outside of the runtime infrastructure. The compute unit object includes one or more restrictions that allow the compute unit object to be used within the runtime infrastructure so that polling for completion is supported. Class diagram 200 further defines "xrt::compute_unit" to wrap a physical implementation of a compute unit referred to herein as a "compute unit circuit." The compute unit circuit can be associated with an execution context that controls how work is divided up between available compute unit circuits and how the compute unit circuits are started. For example, the compute unit circuit may be associate with an execution context by associating the compute unit object representing the compute unit circuit with the execution context.

The polling infrastructure itself is not dependent on the compute unit circuits other than through the "xrt::compute_unit" wrapper class. The polling class "xrt::compute_unit_polling" contains a list of compute unit objects corresponding to compute unit circuits. Thus, each compute unit circuit may be represented by at least one instance of "xrt_compute_unit".

In one aspect, the polling thread includes a list of compute unit objects representing compute unit circuits in an idle operating state. In another aspect, the polling thread also contains a list of events representing compute unit circuits that have yet to complete operation. The list of events representing compute unit circuits that have yet to complete are shown as the "event" within "xrt::compute_unit".

When the runtime starts a compute unit circuit using "xt:compute_unit::start( )", the call is transferred to the compute unit circuit represented as "MyCU" in FIG. 2. In response, the compute unit object calls the execution context that manages the compute unit object, e.g., the execution context with which the compute unit object is associated. The execution context then physically starts the compute unit circuit (e.g., with the next workgroup). The sequence of calls is the same or similar for other xrt::compute_unit function calls.

Figure 3:
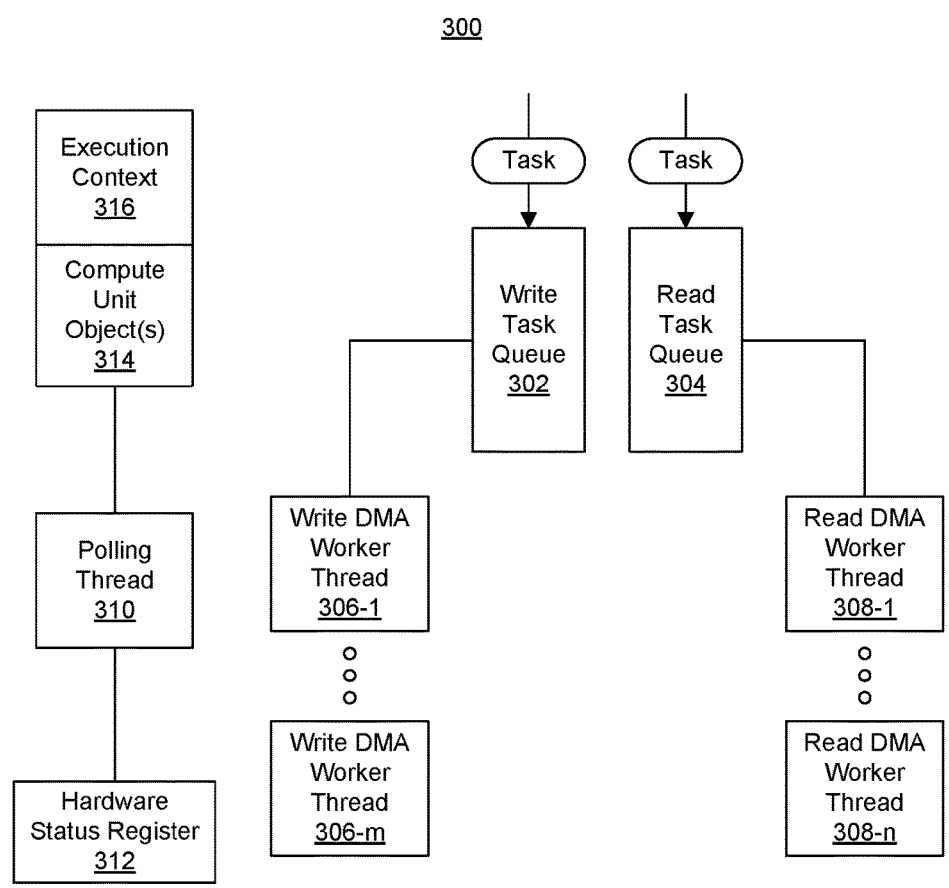
FIG. 3 illustrates an example runtime during execution by a host processor.

FIG. 3 illustrates an example runtime 300. FIG. 3 illustrates an example state of runtime 300 during execution by a host such as host 104 of FIG. 1. In one aspect, runtime 300 uses the architecture described in connection with FIG. 2.

As shown, during execution, runtime 300 maintains two independent task queues. The task queues may be maintained in memory 112. The task queues are shown as write task queue 302 and read task queue 304. The transfer of information from the host system to a processing device is referred to as a "write" operation. The transfer of information from a processing device to the host system is referred to as a "read" operation. Accordingly, runtime 300 includes one task queue for each direction of communication with a processing device such as programmable IC 144.

In one aspect, host 104 is configured to write tasks (e.g., add tasks) to write task queue 302. Tasks stored in write task queue 302 may be referred to herein from time to time as "write tasks." Host 104 offloads functions to a processing device for implementation by one or more compute unit circuits by writing tasks to write task queue 302. The write tasks cause the transfer of data from host system 102 to the processing device for use by the offloaded functions (e.g., as input data for the offloaded functions). Host 104 is further configured to write tasks (e.g., add tasks) to read task queue 304. Tasks stored in read task queue 304 may be referred to herein from time to time as "read tasks." Host 104 reads results generated by compute unit circuits by writing tasks to read task queue 304. The read tasks cause transfer, e.g., retrieval by host system 102, of results generated by the processing device from performing the offloaded functions.

In one aspect, the tasks written to the task queues are implemented as descriptor objects. The descriptor objects may include the arguments being provided to a compute unit circuit. In another aspect, tasks may be specified as a C++ function (or other high level programming language function) with any number of arguments.

Runtime 300 includes a plurality of DMA worker threads. DMA worker threads are capable of processing tasks from either write task queue 302 or read task queue 304. For example, DMA worker threads pop tasks from a task queue and perform the task to support, e.g., effectuate, function offload to the processing device by transferring data. In one aspect, DMA worker threads are configured to operate with either write task queue 302 or with read task queue 304. For example, runtime 300 can include write DMA worker threads 306-1, . . . , 306-$m$, e.g., a subset of the DMA worker threads, that are configured to operate only with write task queue 302. Similarly, runtime 300 can include read DMA worker threads 308-1, . . . , 308-$n$, e.g., a subset of the DMA worker threads, that are configured to operate only with read task queue 304. Thus, the DMA worker threads pop tasks only from the particular task queue with matching direction to effect the data transfer defined by the popped task.

In one aspect, the number (m) of DMA worker threads that support write operations is correlated with the number of concurrent write operations that may be conducted by the processing device. Similarly, the number (n) of DMA worker threads that support read operations is correlated with the number of concurrent read operations that may be conducted by the processing device.

For purposes of illustration, consider an example where DMA controller 150 includes two DMA engines and each DMA engine is capable of performing a write operation and a read operation, where both operations may be performed concurrently. Accordingly, programmable IC 144 is capable of performing two read operations concurrently for memory 146 and is capable of performing two write operations concurrently with memory 146. The read and write operations may be performed concurrently as well. In that case, runtime 300 includes two write DMA worker threads that support write operations and two read DMA worker threads that support read operations.

Write DMA worker threads 306-1 through 306-$m$ are capable of consuming work from write task queue 302. Write DMA worker threads 306-1 through 306-$m$ may execute in parallel to perform concurrent write transactions. Read DMA worker threads 308-1 through 308-$n$ are capable of consuming work from read task queue 304. Read DMA worker threads 308-1 through 308-$n$ are capable of executing in parallel to perform concurrent read transactions. DMA worker threads 306-1 through 306-$m$ and 308-1 through 308-$n$ are capable of operating concurrently. Having two or more write DMA worker threads and two or more read DMA worker threads capable of executing concurrently, referring to the prior example, allows the runtime to keep the DMA engines continually operating with minimal to no idle time.

In one or more embodiments, runtime 300 includes an instance of write task queue 302, read task queue 304, write DMA worker thread(s) 306, and read DMA worker thread(s) 308 for each processing device. For example, in the case where HCS 100 includes multiple accelerators 140 where each accelerator has a programmable IC 144 as the processing device, runtime 300 includes an instance of write task queue 302, read task queue 304, write DMA worker thread(s) 306, and read DMA worker thread(s) 308 for each such accelerator (programmable IC).

In other conventional HCSs, producers wait until a worker thread is ready to consume work before continuing with the next task. Tasks are not stored in a queue to facilitate seamless transitions between tasks. The producer awaits the worker thread being available and then, in response to the worker thread becoming available, provides a next work unit to the worker thread. In accordance with the inventive arrangements described herein, a producer (e.g., a producer function of a host application) can continue to create as many tasks as possible and add these tasks to the proper task queue concurrently with execution of the DMA worker threads consuming the tasks. The DMA worker threads continue to process tasks from the relevant task queue while such tasks are available. The separation of producers from consumers through usage of the separate read and write task queues allows for efficient scheduling of DMA transfers. This allows the host to keep the DMA engine(s) busy at all or nearly all times.

Once a task is added to a task queue, whether write task queue 302 or read task queue 304, the producer has the option of waiting for the task to complete or receiving an event that can be queried at a later time or waited on at a later time. These various ways of determining task completion are used for purposes of dependency tracking. Further, the mechanisms for task completion facilitate efficient scheduling of processing device DMA transfers and processing device execution of hardware accelerated functions (kernels).

Polling thread 310 is implemented as a separate thread that is capable of polling all running compute unit circuits. The compute unit circuits are associated with a function (kernel) that is executed in hardware. When a compute unit circuit is running, the hardware implementing the compute unit circuit is polled periodically to determine whether the compute unit circuit is done executing the work assigned thereto. Polling thread 310 remains active as long as there are compute units running. Once all compute units are done performing work, or no compute unit circuits are running, polling thread 310 is adapted to enter a sleep mode that does not consume cycles of host 104. Polling thread 310 is capable of awakening from the sleep mode in the event that one or more compute unit circuits become active.

In one aspect, polling thread 310 is capable of storing a list of compute unit objects representing compute unit circuits that are currently running (e.g., performing work). For each concurrently running compute unit circuit, polling thread 310 is capable of checking the hardware to determine whether the compute unit circuit has changed state to "done." Referring to FIG. 3, polling thread 310 is capable of checking hardware status registers 312. Hardware status registers 312 are written by the compute unit circuits to indicate current status. Accordingly, polling thread 310 is capable of determining the status of any given compute unit circuit by reading the values stored in hardware status register 312 for the relevant compute unit circuit(s).

In response to determining that a compute unit circuit is done, polling thread 310 removes the compute unit object representing the compute unit circuit from the list of running compute unit circuits maintained within polling thread 310. For example, polling thread 310 changes the state of the compute unit object representing the compute unit circuit from "done" to "idle." A compute unit circuit in the "idle"

state is available for use by any execution context that may be associated with the compute unit circuit as previously described.

Referring to FIG. 3, polling thread 310 determines the status of a selected compute unit circuit from hardware status register 312. The selected compute unit circuit is represented by a compute unit object 314. Polling thread 310, for example, in response to detecting a change in status of the selected compute unit circuit, updates the status of compute unit object 314. If, for example, compute unit object 314 is changed to an "idle" status as discussed, compute unit object 314 may be associated with an execution context other than execution context 316 for performing additional work, thereby reserving the compute unit circuit represented by compute unit object for use by the execution context.

As discussed, functions that are to be accelerated in hardware using the processing device are encapsulated in an execution context. The execution context encapsulates the kernel that implements the function, the compute unit circuits that may be used to execute the function, and information about how the workload of the function is to be executed by the available compute unit circuits.

Within the runtime architecture disclosed herein, compute unit circuits can be shared by multiple execution contexts. For example, a given accelerated function can be executed concurrently by multiple threads on the host system side. As such, a single compute unit circuit may be associated with multiple execution contexts, but may only be used by one of the associated execution contexts at a time to execute the function.

In one aspect, as determined by polling thread 310, each compute unit is capable of operating in one of four states. These states can include "ready," "running," "done," and "idle." The "ready" state can indicate that the compute unit circuit has been acquired by one specific execution context. That execution context is capable of starting the compute unit circuit so that the state of the compute unit circuit becomes "running." In the "running" state, the compute unit circuit is constantly polled by polling thread 310 through hardware status register 312 to check whether the compute unit circuit has finished.

An execution context manages the division of work between available compute unit circuits. The execution context is responsible for starting the next workgroup on an "idle" compute unit circuit. Once all work is complete, the execution context is done and the associated function call has finished. In a sequential program, this scenario corresponds to a function call completing and the program continuing with the next function instruction.

In conventional host systems, polling of compute unit circuits is typically performed in a manner that stalls other operations and/or tasks from being performed by the host system. By utilizing a separate thread for purposes of polling compute unit circuits, the host system is able to continue performing work without stalling the progress of other operations executing therein.

Figure 4:
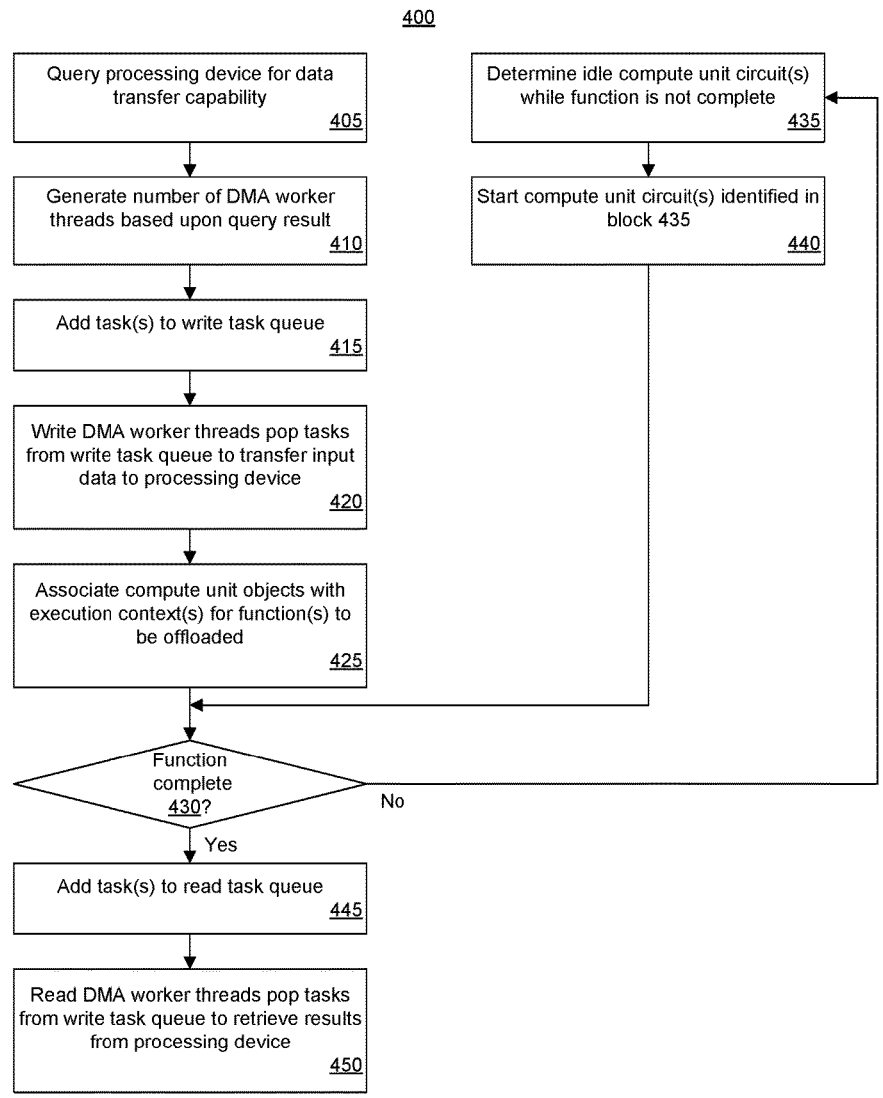
FIG. 4 illustrates an example method of operation for a runtime.

FIG. 4 illustrates an example method 400 of operation for a runtime as described herein with reference to FIGS. 1-3. More particularly, method 400 can be performed by a system described in connection with FIG. 1 executing a runtime as described in connection with FIGS. 2 and 3. Method 400 illustrates general operations performed by the runtime. It should be appreciated, however, that since the runtime is multithreaded, and that the threads are capable of executing in parallel, method 400 illustrates a simplified example of the various operations and timing of operations that are performed.

In block 405, the host queries the processing device for data transfer capability. The host is capable of communicating with the processing device, which is a programmable IC in this example. The data transfer capability refers to the number of concurrent write operations and the number of concurrent read operations that may be performed by the processing device to local memory of the processing device. In this example, the number of concurrent read operations and number of concurrent write operations refer to the number of concurrent read and concurrent write operations performed by DMA engines of the DMA controller of the processing device.

In block 410, the host generates a number of DMA worker threads based upon the query result. For example, the host receives a query result from the processing device. The query result specifies the number of concurrent write operations and the number of concurrent read operations that can be performed. As discussed, some DMA worker threads are devoted solely to performing write operations, while other DMA worker threads are devoted solely to performing read operations. For purposes of illustration, consider the case where the query result indicates that the processing device is capable of performing "m" concurrent write operations and "n" concurrent read operations, where "m" and "n" are integer values (e.g., values of 1, 2, 3, 4, etc.). Accordingly, the host generates "m" write DMA worker threads and "n" read DMA worker threads.

In block 415, the host adds, e.g., writes, one or more tasks to the write task queue. The host writes tasks to the write task queue to transfer input data from the host to the compute units of the processing device in accordance with the delineation of work defined by the execution context. Thus, in block 420, the write DMA worker threads pop tasks from the write task queue to initiate the transfer of input data from the host to the processing device. For example, the write DMA worker threads pop tasks from the write task queue to effectuate the writing of data to the RAM of the processing device.

In block 425, the host associates compute unit objects with execution context(s) for the particular function or functions to be offloaded to the processing device. As described below in greater detail, an execution context is capable of requesting an available compute unit circuit from the polling thread that matches any of the compute unit objects in the execution context.

In block 430, the host determines whether the function, as implemented by the compute units, has completed. The host determines whether the function is complete based upon operation of the polling thread. In response to determining that the function is complete, method 400 continues to block 445. In response to determining that the function is not complete, method 400 continues to block 435 to continue processing.

In block 435, while the function is not complete, the host determines idle compute unit circuit(s). As discussed, the polling thread, which operates as a single, independent thread within the host system, is capable of continually determining the status of the compute unit circuits. The polling thread may read the hardware status register to obtain the status of the compute unit circuits and, in response to reading the hardware status register, update the status of the corresponding compute unit objects within the runtime. Accordingly, the polling thread is capable of providing the system with a compute unit circuit, corresponding to a compute unit object associated with an execution context, that is idle. The host, for example, in block 435, is capable of requesting, from the polling thread (e.g., in executing the polling thread), an idle compute unit circuit corresponding to a compute unit object. The polling thread returns an idle compute unit circuit, e.g., if one is available, in response to the request.

It should be appreciated that the polling thread continues to determine the status of compute unit circuits. The polling thread is capable of polling the status of all compute unit circuits across multiple different processing devices in the HCS. The polling thread updates the status of the compute unit circuits by updating the compute unit objects of the runtime that represent the compute unit circuits within the processing device(s). In this regard, while the DMA worker threads and task queues may be replicated for each processing device, a single polling thread is capable of determining the status of compute units across the various processing devices.

In block 440, the host is capable of starting the compute unit circuit determined in block 435. The started compute unit circuit is added to the polling thread. Accordingly, the polling thread updates the status of compute unit objects representing compute unit circuit(s) started in block 435. A kernel is capable of executing all the work associated with an offloaded function or only a portion of the work associated with an offloaded function. In the latter case, the compute units may require starting, or being called, multiple times to process the input data.

After block 440, method 400 loops back to block 430 to determine whether the function is complete. In response to determining that the function is complete, method 400 continues to block 445. In response to determining that the function is not complete, method 400 proceeds to block 435 as described.

In one aspect, the host is capable of determining the number of tasks within the write task queue. In response to determining that the write task queue contains no tasks, the host is capable of deactivating the write DMA worker threads. In the inactive state, the write DMA worker threads consume no cycles of the host. In response to the host determining that the write task queue stores at least one task, the host is capable of awakening the write DMA worker threads in order to process the tasks.

Continuing with block 445, the host adds, e.g., writes, task(s) to the read task queue. The host writes tasks to the read task queue in order to retrieve results of work completed by the compute unit circuit(s) for the offloaded function. For example, in response to determining that a compute unit circuit has completed operation, the host is capable of writing a task to the read task queue to retrieve the results generated by the compute unit circuit. Thus, in block 450, the read DMA worker threads pop tasks from the read task queue to initiate retrieval of results generated from compute units of the processing device that have finished processing.

As discussed, the host is capable of determining the number of tasks within the read task queue. In response to determining that the read task queue contains no tasks, the host is capable of deactivating the read DMA worker threads. In the inactive state, the read DMA worker threads consume no cycles of the host. In response to the host determining that the read task queue stores at least one task, the host is capable of awakening the read DMA worker threads in order to process the tasks.

Method 400 illustrates scheduling of hardware resources of the HCS and, more particularly, of the processing device, to effectuate read and write operations in order to offload functions from the host system to the processing device(s). Method 400 illustrates the operation of the task queues and how use of the DMA worker threads to facilitate efficient operation and utilization of the hardware resources of the processing device. Moreover, by separating event scheduling from other frameworks, the runtime architecture described herein allows any class of APIs (e.g., OpenCL, OpenMP, CUDA, etc.) to be implemented on top of the infrastructure provided.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to systems. In one aspect, a system is implemented as an HCS. The system can include a host memory and a host processor. The host memory is configured to maintain a write task queue and a read task queue. The host processor is coupled to the host memory and a processing device. The host processor is adapted to add write tasks to the write task queue. The write tasks cause transfer of input data to the processing device. The processing device is adapted to perform functions offloaded from the host processor. The host processor is adapted to add read tasks to the read task queue. The read tasks cause transfer of results from the functions from the processing device. The host processor is further adapted to maintain a number of DMA worker threads corresponding to concurrent data transfer capability of the processing device.

Each DMA worker thread is preconfigured to execute tasks from the write task queue or the read task queue.

In an aspect, the concurrent data transfer capability indicates a number of concurrent write operations and a number of concurrent read operations the processing device is capable of performing.

In another aspect, the number of DMA worker threads is equal to a sum of the number of concurrent write operations and the number of concurrent read operations.

In another aspect, a plurality of the write DMA worker threads execute concurrently and a plurality of the read DMA worker threads execute concurrently.

In another aspect, a plurality of DMA worker threads are maintained. Accordingly, a first subset of the plurality of DMA worker threads are preconfigured to process tasks from the write task queue and execute concurrently. Further, a second subset of the plurality of DMA worker threads are preconfigured to process tasks from the read task queue and execute concurrently.

In another aspect, the host processor is adapted to determine the number of DMA worker threads by querying the processing device.

In another aspect, the processing device is adapted to implement a compute unit circuit for performing at least one of the offloaded functions. The host processor is further adapted to generate an execution context in the host memory, wherein the execution context encapsulates a compute unit object representing the compute unit circuit, and wherein the compute unit object stores a status of the corresponding compute unit circuit.

In another aspect, the execution context is adapted to start operation of the compute unit circuit represented by the compute unit object.

In another aspect, the host processor is adapted to execute a polling thread adapted to poll the compute unit circuit and update the status of the compute unit object representing the compute unit circuit based upon the polling.

In another aspect, the host processor is adapted to execute an independent polling thread configured to determine operating status of compute unit circuits of the processing device.

In another aspect, the independent polling thread is configured to determine status of compute unit circuits across a plurality of different processing devices.

One or more embodiments are directed to methods of scheduling hardware resources within an HCS. In one aspect, the method can include adding, using a processor, write tasks to a write task queue, wherein the write tasks cause transfer of input data to a processing device adapted to perform functions offloaded from the processor. The method can include adding, using the processor, read tasks to a read task queue, wherein the read tasks cause transfer of results of the functions from the processing device. The method can include executing, using the processor, a number of write DMA worker threads corresponding to concurrent write capability of the processing device, wherein the write DMA worker threads are configured to process the write tasks from the write task queue. The method can include executing, using the processor, a number of read DMA worker threads corresponding to concurrent read capability of the processing device, wherein the read DMA worker threads are configured to process read tasks from the read task queue.

In an aspect, the concurrent write capability indicates a number of concurrent write operations and the concurrent read capability indicates a number of concurrent read operations the processing device is capable of performing.

In another aspect, the number of DMA worker threads is equal to a sum of the number of concurrent write operations and the number of concurrent read operations.

In another aspect, a plurality of the write DMA worker threads execute concurrently and a plurality of the read DMA worker threads execute concurrently.

In another aspect, the method can include determining the number of write DMA worker threads and the number of read DMA worker threads by querying the processing device.

In another aspect, the processing device is adapted to implement a compute unit circuit for performing at least one of the offloaded functions. Accordingly, the method can include generating an execution context in a host memory, wherein the execution context encapsulates a compute unit object representing the compute unit circuit, and wherein the compute unit object stores a status of the corresponding compute unit circuit.

In another aspect, the execution context is adapted to start operation of the compute unit circuit represented by the compute unit object.

In another aspect, the method can include executing a polling thread adapted to poll the compute unit circuit and update the status of the compute unit object representing the compute unit circuit based upon the polling.

In another aspect, the method can include executing an independent polling thread configured to determine operating status of compute unit circuits of the processing device.

In another aspect, the independent polling thread is configured to determine status of compute unit circuits across a plurality of different processing devices.

One or more embodiments are directed to computer program products for scheduling hardware resources within an HCS. In one aspect, a computer program product includes a computer readable storage medium having program code stored thereon. The program code is executable by a processor to perform operations including adding, using the processor, write tasks to a write task queue, wherein the write tasks cause transfer of input data to a processing device adapted to perform functions offloaded from the processor. The operations can include adding, using the processor, read tasks to a read task queue, wherein the read tasks cause transfer of results of the functions from the processing device. The operations can include executing, using the processor, a number of write DMA worker threads corresponding to concurrent write capability of the processing device, wherein the write DMA worker threads are configured to process the write tasks from the write task queue. The operations further can include executing, using the processor, a number of read DMA worker threads corresponding to concurrent read capability of the processing device, wherein the read DMA worker threads are configured to process read tasks from the read task queue.

In an aspect, the concurrent write capability indicates a number of concurrent write operations and the concurrent read capability indicates a number of concurrent read operations the processing device is capable of performing.

In another aspect, the number of DMA worker threads is equal to a sum of the number of concurrent write operations and the number of concurrent read operations.

In another aspect, a plurality of the write DMA worker threads execute concurrently and a plurality of the read DMA worker threads execute concurrently.

In another aspect, the method can include determining the number of write DMA worker threads and the number of read DMA worker threads by querying the processing device.

In another aspect, the processing device is adapted to implement a compute unit circuit for performing at least one of the offloaded functions. Accordingly, the method can include generating an execution context in a host memory coupled to the processor, wherein the execution context encapsulates a compute unit object representing the compute unit circuit, and wherein the compute unit object stores a status of the corresponding compute unit circuit.

In another aspect, the execution context is adapted to start operation of the compute unit circuit represented by the compute unit object.

In another aspect, the method can include executing a polling thread adapted to poll the compute unit circuit and update the status of the compute unit object representing the compute unit circuit based upon the polling.

In another aspect, the method can include executing an independent polling thread configured to determine operating status of compute unit circuits of the processing device.

In another aspect, the independent polling thread is configured to determine status of compute unit circuits across a plurality of different processing devices.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
 a host memory configured to maintain a write task queue and a read task queue;
 a host processor coupled to the host memory and a processing device having a direct memory access (DMA) engine, wherein the host processor is adapted to:
 add write tasks to the write task queue, wherein the write tasks cause transfer of input data to the processing device and the processing device is adapted to hardware accelerate offloaded functions from the host processor;
 add read tasks to the read task queue, wherein the read tasks cause transfer of results of the offloaded functions from the processing device;
 query the processing device to determine a number of concurrent data transfers the DMA engine is able to perform; and
 generate and maintain a number of DMA worker threads corresponding to concurrent data transfer capability of the DMA engine of the processing device, wherein each DMA worker thread is preconfigured to execute tasks from the write task queue or the read task queue.

2. The system of claim 1, wherein the concurrent data transfer capability indicates a number of concurrent write operations and a number of concurrent read operations the DMA engine is capable of performing.

3. The system of claim 1, wherein the processing device includes a plurality of compute unit circuits configured to hardware accelerate the offloaded functions, wherein the host processor is adapted to:
 determine an idle compute unit circuit in the processing device by executing a polling thread and schedule work on the idle compute unit.

4. The system of claim 1, wherein a plurality of DMA worker threads are maintained and, wherein:
 a first subset of the plurality of DMA worker threads are preconfigured to process tasks from the write task queue and execute concurrently; and
 a second subset of the plurality of DMA worker threads are preconfigured to process tasks from the read task queue and execute concurrently.

5. The system of claim 1, wherein the processing device is a programmable integrated circuit.

6. The system of claim 5, wherein the processing device is adapted to implement a plurality of compute unit circuits for hardware accelerating the offloaded functions, wherein the host processor is further adapted to:
 generate execution contexts in the host memory, wherein each execution context encapsulates a compute unit object representing a compute unit circuit, and wherein the compute unit object stores a status of the corresponding compute unit circuit.

7. The system of claim 6, wherein each execution context is adapted to start operation of the compute unit circuit represented by the compute unit object.

8. The system of claim 6, wherein the host processor is adapted to:
 execute a polling thread adapted to poll the plurality of compute unit circuits and update the status of the compute unit objects representing the respective plurality of compute unit circuits based upon the polling.

9. The system of claim 1, wherein the host processor is adapted to:
 execute an independent polling thread configured to determine operating status of a plurality of compute unit circuits implemented in the processing device, wherein the plurality of compute unit circuits hardware accelerate the offloaded functions.

10. The system of claim 9, wherein the plurality of compute unit circuits are implemented across a plurality of different programmable integrated circuits.

11. A method of scheduling hardware resources within a heterogeneous computing system, the method comprising:
 adding, using a processor, write tasks to a write task queue, wherein the write tasks cause transfer of input data to a processing device adapted to hardware accelerate offloaded functions from the processor, wherein the processing device has a direct memory access (DMA) engine;
 adding, using the processor, read tasks to a read task queue, wherein the read tasks cause transfer of results of the offloaded functions from the processing device;
 querying the processing device to determine a number of concurrent write operations and a number of concurrent read operations the DMA engine is able to perform;
 generating and executing, using the processor, a number of write DMA worker threads corresponding to the number of concurrent write operations the DMA engine is able to perform, wherein the write DMA worker threads are configured to process the write tasks from the write task queue; and
 generating and executing, using the processor, a number of read DMA worker threads corresponding to the number of concurrent read operations that the DMA engine is able to perform, wherein the read DMA worker threads are configured to process read tasks from the read task queue.

12. The method of claim 11, wherein the processing device includes a plurality of compute unit circuits configured to hardware accelerate the offloaded functions, the method further comprising:

determining an idle compute unit circuit in the processing device by executing a polling thread and scheduling work on the idle compute unit.

13. The method of claim 11, wherein a plurality of the write DMA worker threads execute concurrently and a plurality of the read DMA worker threads execute concurrently.

14. The method of claim 11, wherein the processing device is a programmable integrated circuit.

15. The method of claim 14, wherein the processing device is adapted to implement a plurality of compute unit circuits for hardware accelerating the offloaded functions, the method further comprising:

generating execution contexts in a host memory, wherein each execution context encapsulates a compute unit object representing a compute unit circuit, and wherein the compute unit object stores a status of the corresponding compute unit circuit.

16. The method of claim 15, wherein each execution context is adapted to start operation of the compute unit circuit represented by the compute unit object.

17. The method of claim 15, further comprising:

executing a polling thread adapted to poll the plurality of compute unit circuits and update the status of the compute unit objects representing the respective plurality of compute unit circuits based upon the polling.

18. The method of claim 11, further comprising:

executing an independent polling thread configured to determine operating status of a plurality of compute unit circuits implemented in the processing device, wherein the plurality of compute unit circuits hardware accelerate the offloaded functions.

19. The method of claim 18, wherein the plurality of compute unit circuits are implemented across a plurality of different programmable integrated circuits.

20. A computer program product comprising a computer readable storage medium having program code stored thereon for scheduling hardware resources within a heterogeneous computing system, the program code executable by a processor to perform operations comprising:

adding, using the processor, write tasks to a write task queue, wherein the write tasks cause transfer of input data to a processing device adapted to hardware accelerate offloaded functions from the processor, wherein the processing device has a direct memory access (DMA) engine;

adding, using the processor, read tasks to a read task queue, wherein the read tasks cause transfer of results of the offloaded functions from the processing device;

querying the processing device to determine a number of concurrent write operations and a number of concurrent read operations the DMA engine is able to perform;

generating and executing, using the processor, a number of write DMA worker threads corresponding to the number of concurrent write operations the DMA engine is able to perform, wherein the write DMA worker threads are configured to process the write tasks from the write task queue; and generating and executing, using the processor, a number of read DMA worker threads corresponding to the number of concurrent read operations the DMA engine is able to perform, wherein the read DMA worker threads are configured to process read tasks from the read task queue.

* * * * *